United States Patent [19]
Hulscher

[11] Patent Number: 5,702,030
[45] Date of Patent: Dec. 30, 1997

[54] ROTATIONAL ARM-TYPE CONTACT FEEDING SYSTEM

[75] Inventor: Mark E. Hulscher, Seattle, Wash.

[73] Assignee: The Boeing Company, Seattle, Wash.

[21] Appl. No.: 585,373

[22] Filed: Jan. 11, 1996

[51] Int. Cl.$^6$ ................................................. A24F 15/04
[52] U.S. Cl. ...................... 221/254; 221/200; 221/2; 221/239; 221/236; 221/251; 198/389; 29/809; 29/816; 29/821; 29/823; 29/739; 29/759
[58] Field of Search ........................ 198/389; 221/225, 221/236, 239, 251, 254, 200; 29/739, 759, 809, 816, 821, 822, 823

[56] References Cited

U.S. PATENT DOCUMENTS

| | | | |
|---|---|---|---|
| 3,054,170 | 9/1962 | Benichasa et al. | 198/389 |
| 3,633,791 | 1/1972 | Kelly . | |
| 4,182,030 | 1/1980 | Mullins | 29/809 |
| 4,407,402 | 10/1983 | Nishimura et al. | 198/389 |
| 4,450,948 | 5/1984 | Naito et al. | 198/389 |
| 4,782,588 | 11/1988 | Janguard | 29/809 |
| 5,392,954 | 2/1995 | Gartz | 221/225 |

*Primary Examiner*—William E. Terrell
*Assistant Examiner*—Khoi H. Tran
*Attorney, Agent, or Firm*—Christensen O'Connor Johnson & Kindness PLLC

[57] ABSTRACT

A feeding system for feeding blank contacts to a crimping device for crimping the contacts onto ends of lead wires. The contact feed system includes a bowl, and a scoop for removing contacts from the bowl. The scoop is preferably mounted on the end of a rotating arm so that the scoop describes the locus of a circumference of a vertical circle when the arm rotates. Contacts fall, under gravity, from the scoop, when it is near the apogee of travel, onto an angled chute that guides the contacts into a space between two parallel contact orienting rails. The contacts are stacked between the supporting contact orienting rails and a shuttle gate controlledly carries a single contact at a time into a drop tube that feeds the contact to a crimping device for crimping onto an end of a wire lead. In accordance with the invention, a plurality of the above-described feed systems may be connected through their respective drop tubes to a single crimping device, thereby allowing greater operator flexibility in changing from one type of specialized contact crimping to another.

16 Claims, 3 Drawing Sheets

5,702,030

ROTATIONAL ARM-TYPE CONTACT FEEDING SYSTEM

FIELD OF THE INVENTION

The invention relates to an apparatus for feeding blank electrical contacts to a crimping machine for crimping the contacts onto ends of electrical leads. More particularly, the contact feeder uses a rotational arm fired with a scoop, to select blank contacts from a bin for feeding to a crimping machine. Due to the compact structure and low cost of the rotational arm-type contact feeding system, several of these can be mounted to serve a single contact crimper.

BACKGROUND OF THE INVENTION

In order to provide electrical leads with contacts at either end that provide good electrical communication with the lead, it is known in the an to mechanically crimp contact blanks onto each end of the lead. The crimping process is mechanical, and is automated to some extent. Usually, a supply bowl, typically of a vibrating type, is filled with blank contacts. The vibration of the bowl feeds the blank contacts to the crimp head of the crimping machine. The contact is then crimped onto the end of an electrical lead, typically by activation of the crimp head by an operator depressing a foot pedal.

The semi-automated electrical contact crimping machines are relatively expensive but can be operated at a high throughput. Therefore, they usually find application in "high use" crimping operations where a commonly used electrical contact must be crimped onto a lead. Under these conditions long "runs" are possible wherein the crimper applies only one specific contact to electrical leads. In general, the machines have limited flexibility in that they will typically only feed two different types of contacts into a crimp head. This is particularly disadvantageous when the user, of necessity, must apply a wide variety of contacts onto electrical leads for specialized applications. Even though some of these specialized applications require relatively low volumes of leads equipped with specialized contacts in comparison with the "high use" contacts, nevertheless the absolute number of these leads may be high. However, the specialized number of leads may not be sufficiently high to justify the purchase of additional crimping machines. As pointed out above, semi-automatic crimping machines are expensive. Moreover, the machines are relatively large, requiring a significant mount of work station space. In a typical machine shop, additional floor space may not be readily available. Consequently, even if additional machines could be purchased, the cost of additional floor space should also be taken into account.

There is a need for a system for feeding contact blanks to a crimping machine that removes the current limitation that the crimp head can only be supplied with two different types of contacts. Moreover, the feed system should be of low cost to justify its installation to produce relatively low volumes of leads fitted with specialized electrical contacts. Finally, the feed system should be compact, preferably not requiring significant additional space, and allow the efficient use of existing space together with existing crimping machines.

SUMMARY OF THE INVENTION

The invention provides an electrical contact feed system for supplying blank electrical contacts to a crimping machine for swaging onto the ends of electrical leads. The feed system is of low cost, compact, and a plurality of the feed systems may be coupled to a single crimping device, thereby providing flexibility in selection between a variety of specialized electrical contacts for the crimping operation.

The blank contact feeder system includes a substantially hemispherical contact feeder bowl that is usually at least partially filled with blank contacts. A rotatable crank arm has one end coupled to a drive motor, and a scoop is attached to the other end. The scoop is adapted to capture, and remove, contacts from the contact feed bowl. During rotation of the crank arm, the scoop describes a locus of a circumference of a vertically oriented circle. Thus, when the scoop is at the lowest end of the circumference, it is oriented to scoop up contacts; and when it is at the highest point ("apogee") of the locus of the circle, it is oriented to drop the contacts onto an angled chute that extends to beneath the scoop. The chute guides the contact blank under gravity into the space between a pair of parallel spaced contact orienting rails located beneath the chute. The space between the rails is sized to accommodate the lower body portion of the blank contacts, while supporting outward extending shoulders of the contacts so that the contacts are held upright between the rails. The rails are inclined at a slight angle to a horizontal plane to aid movement so that contacts gradually slide towards a lower end of the mils to abut against a controlled shuttle gate. Optionally, the rails may be vibratable to further assist contact blank movement. The shuttle gate blocks further movement of the contacts along the rails and is controlled by the operator. The face of the shuttle gate facing the rails has a channel therein sized to receive a single contact blank. When the gate controlledly opens, in response to operator demand, the shuttle gate slides forward to drop the single contact blank from the channel into a drop tube that directs the electrical contact into the head of the crimping device for crimping onto an electrical lead.

In accordance with the invention, a plurality of feeder systems may be connected through their respective drop tubes, to a single crimping device. Thus, upon demand, an operator can select from which feeder system an electrical contact blank must be charged to the crimping device for a particular application. Typically, it is expected that an operator will continuously first prepare electrical leads with one particular electrical contact, then switch to a different contact feeder system to prepare electrical leads of a different type.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention provides a system for feeding contact blanks from one, or a plurality, of rotational am-type contact feeders. Each of the feeders of the invention may optionally supply blank contacts to a drop tube that is routed to a crimping device. The operator may then select the appropriate feeder depending on which of the contacts should be crimped onto the ends of a particular electrical lead.

Figure 1:
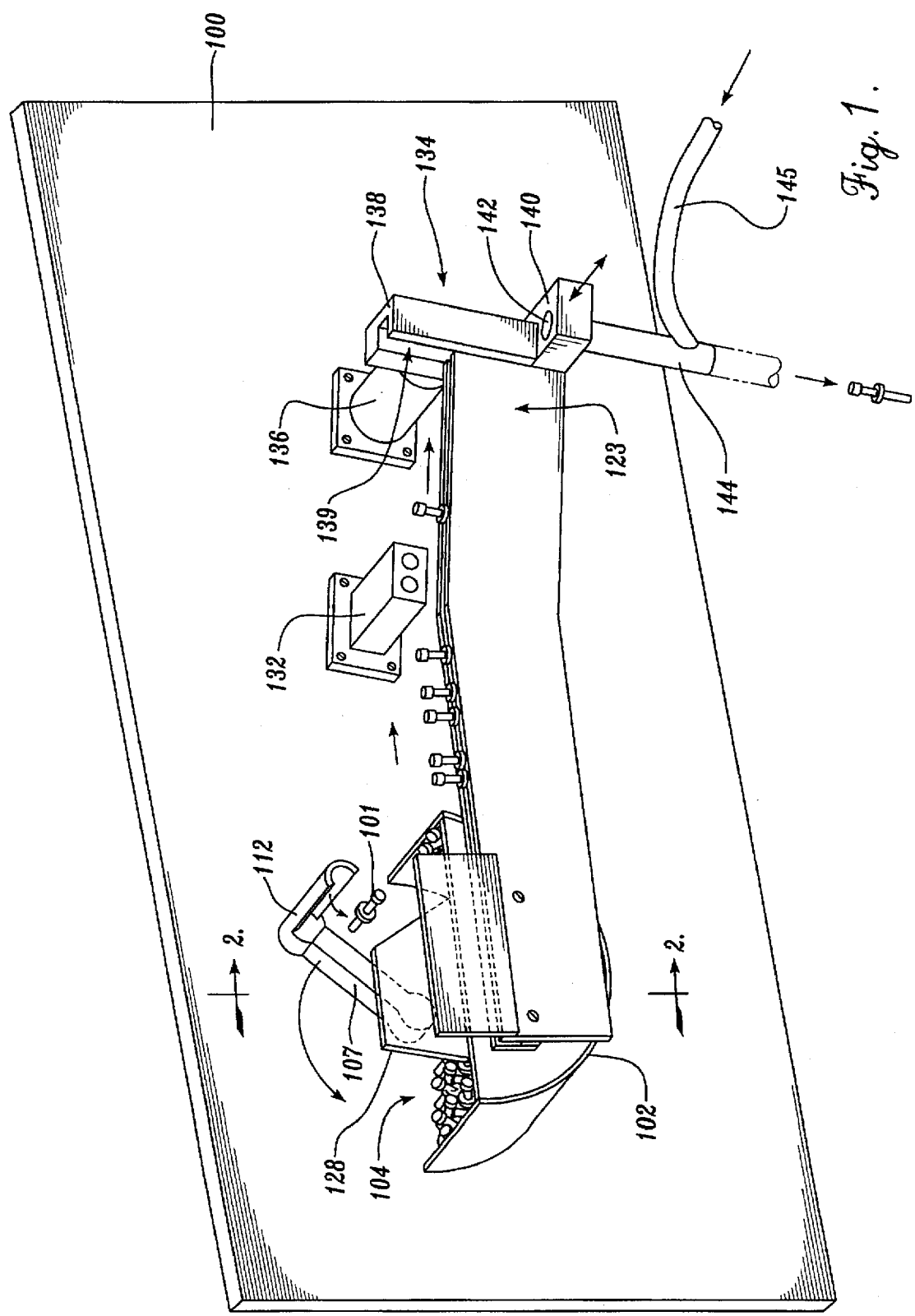
FIG. 1 is a schematic diagram of an embodiment of a rotational a-type contact feeding system of the invention.

The advantages of the invention may be better understood with reference to the appended figures illustrating schematically a preferred embodiment of the invention. Referring to FIG. 1, the apparatus of the invention is mounted on a vertical mounting plate 100. A bowl 102 is mounted on one side of the mounting plate to form a semi-cylindrical contact-container space 104 between the plate and the bowl. As will be explained later, this bowl is at least partially filled with blank contacts 101 of the desired type.

Figure 2:
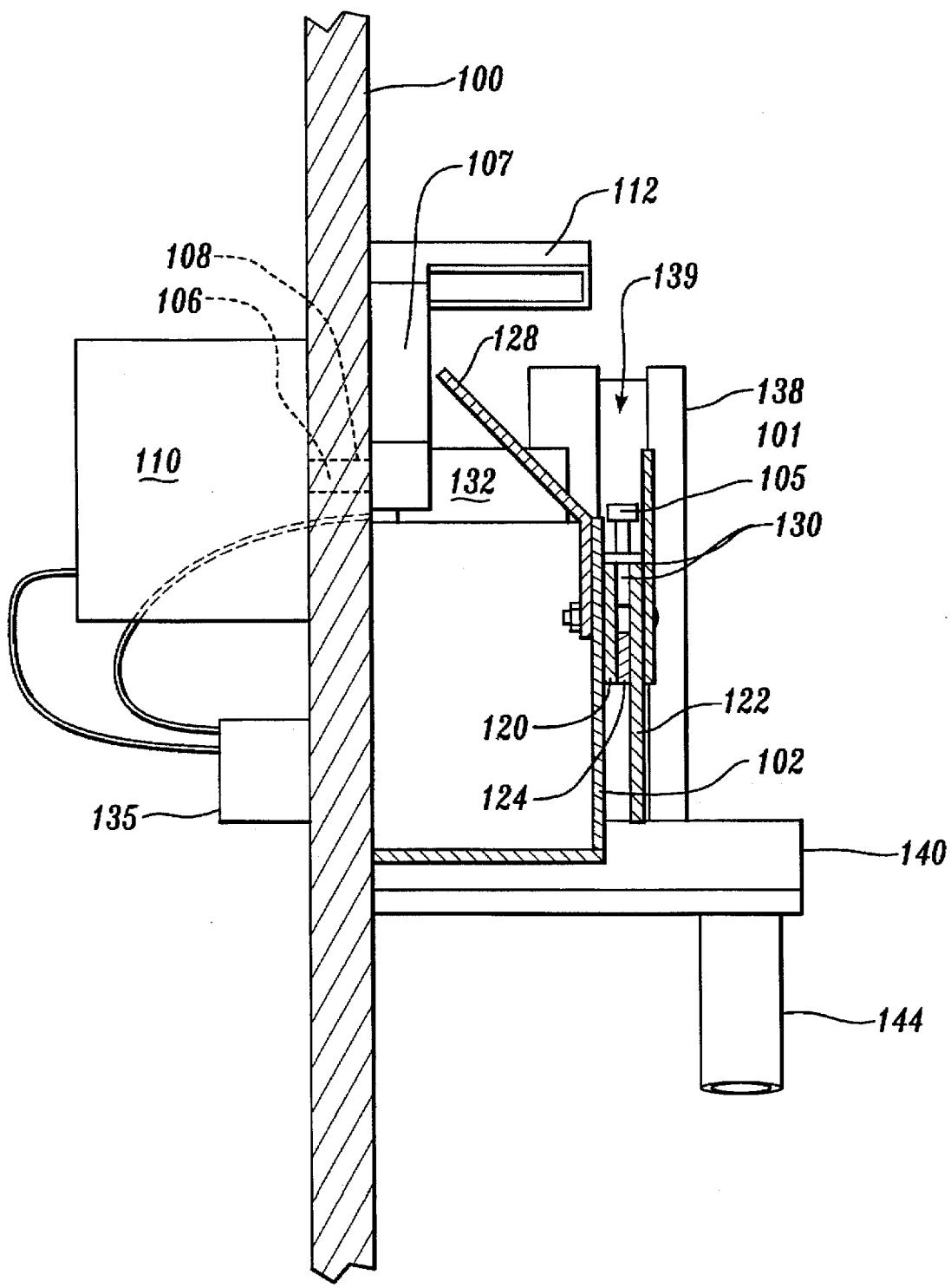
FIG. 2 is a schematic cross sectional view at 2—2 of FIG. 1, showing details of the spaced-apart rails of the system.

A throughbore 108 extends through the plate so that a horizontal line through the center of the bore is approximately coincident with the center point on the horizontal upper edge of the semi-cylindrical bowl 102. A rotatable arm 106 extends through the throughbore and is driven by a motor 110 mounted to the rear side of the mounting plate 100. The portion of the rotatable arm that extends through the throughbore into the space in the bowl 104 is bent at an angle, in this embodiment 90°. Preferably the center of rotation of the arm is below and to one side of the center of the bowl and the angled portion of the rotatable arm 107 is shorter than the radius of the cylindrical bowl 102 so that when the arm 106 rotates, the tip of the angled portion of the arm 107 describes the locus of a circumference of a vertically-oriented circle, preferably just touching the bottom inside surfaces of the bowl 102. A contact scoop 112 is mounted on the end of the angled portion of the rotatable arm, and is oriented substantially horizontally. Thus, as arm 106 rotates, usually at about 4 rpm, scoop 112 captures blank contacts from bowl 102 and, as the scoop approaches the highest point of the circumference of the circle that it traverses, contacts slide from the scoop onto a planar angled chute 128 that directs the contacts into a space between two parallel rails 120, 122. The chute, as can be seen more clearly in FIG. 2, is an angled sheet of metal (or plastic) extending from points of attachment on the outer end of the bowl 102, upwardly at an acute angle to the horizontal over a portion of the bowl. Thus, the chute is able to intercept and guide contacts released from the scoop 112 onto the rails below.

The parallel contact orienting rails 120 and 122 are more clearly seen in FIG. 2. The rails are spaced apart, preferably with a spacer 124 of constant thickness interposed between the rails. The spacer 124 is of a thickness that approximates the width of a lower portion of a contact blank 101. Thus, the space between the rails is sized so that the width of a lower end 105 of a contact blank 101 is able to slide easily between the rails. The contact blank 101 is supported on the rails, with lower portion extending between the rails, by a surrounding shoulder extending outward from near the midpoint of the contact blank 101. Referring back to FIG. 1, the contact orienting rails 120 and 122 are inclined at a slight angle to the horizontal, so that contacts mounted on the rails are gradually moved toward a far end 123 of the rails. The opening and closing of the shuttle as will be explained below, causes some vibration of the rails and assists in moving the contacts. Alternatively, a vibrator may be attached to the rails or a blast of air may be used to move the blank contacts to the far ends 123 of the rails. The far ends of the rails 123 are angled downward and terminate at a shuttle gate 138 that prevents contacts from falling off the ends of the rails. As a result, contact blanks are stacked, one behind the other, in the downwardly angled lower end 123 of the rails. An infrared sensor 132 is aligned to scan a predetermined distance from the far end of the rails. The infrared sensor 132 is in electrical communication with a controller 135 that either controls the speed of the rotatably arm drive motor 110 or turns it on or off. Thus, when contacts are stacked to the extent that the rearmost contacts (i.e., the last to be stacked) intercept a beam from the infrared sensor, then the rotating arm is slowed, or brought to a halt.

The shuttle gate 138 has a longitudinal channel 139 in its face that is sized to fit a contact blank, i.e., it has a depth corresponding to the thickness of a contact blank and a width and length approximating the width and length of the contact blank. Thus, the first contact blank at the very end of the downward angled rail portion 123 slides into the channel 139. As shown, the shuttle gate is mounted slidingly onto a base 140 so that the contact blank cannot slide down and out of the channel to fall under gravity. The base has a throughbore 142 at a far end, aligned with the channel in the shuttle gate. A drop tube 144 extends from the throughbore to the crimping device 150. To feed a contact blank to the crimping device, an air cylinder 136 is activated, by operator control, and pushes the shuttle gate slidingly transversely across the ends of the rails so that the contact blank held in channel 139 is deposited in throughbore 142 and carried in drop tube 144 to the crimping device 150. Preferably, an air tube 145 located below the throughbore 142 provides jets of air to push the contact along the drop tube 144 to the crimping device 150. After dropping the blank into the drop tube, the shuttle gate slides back to its former position so that a next contact blank slides into the channel 139.

Figure 3:
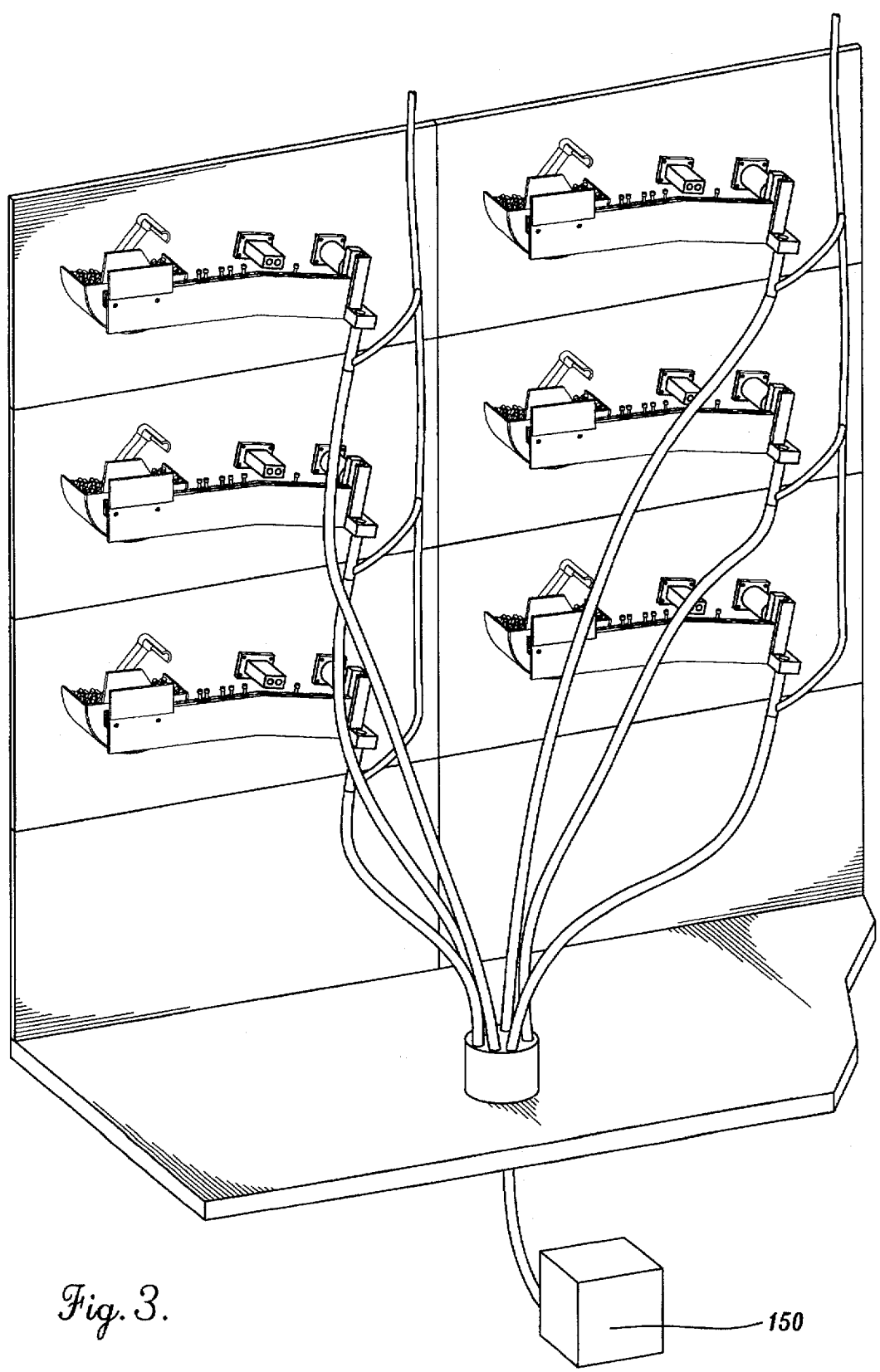
FIG. 3 is a schematic diagram illustrating interconnection of a multiplicity of contact feeding systems into a common crimping head, in accordance with the invention.

As shown in FIG. 3, a plurality of these rotational arm-type contact feeders of the invention may be mounted to a single mounting plate with each of the respective drop tubes directed into a crimper. An operator is then able to select which feeder to use, based on the type of contact blanks in the feeder, and thereby produce an electrical lead with these contacts at each end.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A contact blank feeder for supplying blank electrical contacts to a device for crimping the contacts onto ends of electrical leads, the feeder comprising:

(a) a substantially semi-cylindrical bowl for holding electrical contact blanks;

(b) a rotatable arm having one end coupled to a drive motor and another end extending into the bowl so that the another end describes the locus of a circumference of a vertical circle when the arm rotates;

(c) a scoop attached to the another end of the arm, the scoop adapted to capture and remove contact blanks from the contact feed bowl;

(d) a chute located beneath an apogee of travel of the scoop to receive contact blanks falling under gravity from the scoop;

(e) a pair of parallel spaced contact-orienting rails, the rails positioned beneath the chute to receive contact blanks from the chute, the spaced rails supporting the contact blanks therebetween, and the rails oriented at an angle to a horizontal plane to slide contact blanks toward lower ends of the rails; and (f) a shuttle gate at the lower ends of the rails, the gate blocking further movement of the contact blanks beyond the lower ends of the rails, the gate controlledly slidable transversely across said rails to allow passage of a single contact blank into a drop tube extending downward from near the lower ends of the rails for supplying the contact blank to the device for crimping the contact blanks onto ends of electrical leads.

2. The feeder of claim 1, wherein the scoop is substantially in the form of a hollow semi-cylinder with an outward extending open end.

3. The feeder of claim 1, wherein each of the contact-orienting rails have a downward extending portion terminating in the lower ends of the rails.

4. The feeder of claim 1, wherein the shuttle gate comprises a face, the face abutting against the lower ends of the rails, the face comprising a channel sized to receive a blank contact therein.

5. The feeder of claim 1, wherein said shuttle gate includes a channel and further comprising a shuttle gate base located beneath the shuttle gate, the shuttle gate able to reciprocate slidingly along the base, the base having a throughbore along a locus of movement of the said channel when the shuttle gate reciprocates said throughbore having a drop tube mechanically affixed thereto.

6. The feeder of claim 5, further comprising a controlled pressurized air cylinder in mechanical communication with the shuttle gate, said shuttle gate also includes a channel, wherein the air cylinder is able to reciprocate the shuttle gate from a first position wherein the channel of the shuttle gate is aligned with the space between the contact-orienting rails, to a second position, wherein the channel of the shuttle gate is aligned with a throughbore on the shuttle gate base so that a contact blank in the channel is able to enter a drop tube through the throughbore.

7. The feeder of claim 1, further comprising:

a sensor able to detect the length of a queue of contact blanks on the contact-orienting rails; and a controller in electrical communication with the sensor and with the drive motor of the rotatable arm.

8. The feeder of claim 7, wherein the sensor is an infra-red sensor.

9. A system of feeding any of a variety of contact blanks to a crimping device, the system comprising a plurality of contact blank feeders, each feeder comprising:

(a) a bowl for containing electrical contact blanks;

(b) a rotatable arm having one end coupled to a drive motor and another end extending into the bowl so that the another end describes the locus of a circumference of a vertical circle when the arm rotates;

(c) a scoop attached to the another end of the arm, the scoop adapted to capture and remove contact blanks from the contact feed bowl;

(d) a chute located beneath an apogee of travel of the scoop to receive contact blanks falling under gravity from the scoop;

(e) a pair of parallel spaced contact-orienting rails, the rails positioned beneath the chute to receive contact blanks from the chute, the spaced rails supporting the contact blanks therebetween, and the rails oriented at an angle to a horizontal plane to slide contact blanks toward lower ends of the rails; and (f) a shuttle gate at the lower ends of the rails, the gate blocking further movement of the contact blanks beyond the lower ends of the rails, the gate controlledly slidable transversely across said rails to allow passage of a single contact blank into a drop tube extending downward from near the lower ends of the rails for supplying the contact blank to the device for crimping the contact blanks onto ends of electrical leads.

10. The system of claim 9, wherein the scoop is substantially in the form of a hollow semi-cylinder with an outward extending open end.

11. The system of claim 9, wherein each of the contact-orienting rails have a downward extending portion terminating in the lower ends of the rails.

12. The system of claim 9, wherein the shuttle gate comprises a face, the face abutting against the lower ends of the rails, the face comprising a channel sized to receive a blank contact therein.

13. The system of claim 9, wherein said shuttle gate includes a channel and further comprising a shuttle gate base located beneath the shuttle gate, the shuttle gate able to reciprocate slidingly along the base, the base having a throughbore along a locus of movement of the said channel when the shuttle gate reciprocates said throughbore having a drop tube mechanically affixed thereto.

14. The system of claim 13, further comprising a controlled pressurized air cylinder in mechanical communication with the shuttle gate, said shuttle gate also includes a channel, wherein the air cylinder is able to reciprocate the shuttle gate from a first position wherein the channel of the shuttle gate is aligned with the space between the contact-orienting rails, to a second position, wherein the channel of the shuttle gate is aligned with a throughbore on the shuttle gate base so that a contact blank in the channel is able to enter a drop tube through the throughbore.

15. The system of claim 9, further comprising:

a sensor able to detect the length of a queue of contact blanks on the contact-orienting rails; and a controller in electrical communication with the sensor and with the drive motor of the rotatable arm.

16. The system of claim 15, wherein the sensor is an infra-red sensor.

* * * * *

UNITED STATES PATENT AND TRADEMARK OFFICE
CERTIFICATE OF CORRECTION

PATENT NO. : 5,702,030
DATED : December 30, 1997
INVENTOR(S) : M.E. Hulscher

It is certified that error appears in the above-indentified patent and that said Letters Patent is hereby corrected as shown below:

| COLUMN | LINE | | |
|---|---|---|---|
| 5 (Claim 5, | 21 line 5) | "the said channel" should read --said channel-- | |
| 5 (Claim 5, | 22 line 6) | After "reciprocates" insert --,-- | |
| 6 (Claim 9, | 2 line 13) | "failing" should read --falling-- | |
| 6 (Claim 13, | 31 line 5) | "the said channel" should read --said channel-- | |
| 6 (Claim 13, | 32 line 6) | After "reciprocates" insert --,-- | |

Signed and Sealed this

Twenty-fourth Day of March, 1998

Attest:

BRUCE LEHMAN

Attesting Officer     Commissioner of Patents and Trademarks